US012750141B2

(12) United States Patent
Moon et al.

(10) Patent No.: US 12,750,141 B2
(45) Date of Patent: Sep. 29, 2026

(54) APPARATUS AND METHOD FOR POLARIZATION CONTROL IN COHERENT OPTICAL RECEPTION SYSTEM

(71) Applicant: ELECTRONICS AND TELECOMMUNICATIONS RESEARCH INSTITUTE, Daejeon (KR)

(72) Inventors: Sang Rok Moon, Daejeon (KR); Hun Sik Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 263 days.

(21) Appl. No.: 18/589,400

(22) Filed: Feb. 27, 2024

(65) Prior Publication Data

US 2024/0291572 A1 Aug. 29, 2024

(30) Foreign Application Priority Data

Feb. 28, 2023 (KR) ........................ 10-2023-0026616

(51) Int. Cl.

*H04B 10/06* (2006.01)
*H04B 10/61* (2013.01)
*H04B 10/64* (2013.01)

(52) U.S. Cl.

CPC ......... *H04B 10/64* (2013.01); *H04B 10/6151* (2013.01)

(58) Field of Classification Search

CPC ........................... H04B 10/64; H04B 10/6151; H04B 10/0795; H04B 10/40; H04B 10/616; H04B 10/6164; H04B 10/61; H04B 10/614; H04B 10/615; H04B 10/674; H04B 10/671; H04B 10/672; H04J 14/06

USPC ....... 398/202, 203, 204, 205, 206, 207, 208, 398/209, 210, 211, 212, 213, 214, 135, 398/136, 33, 38, 25, 26, 27, 158, 159, 398/152, 65, 183, 184, 188

See application file for complete search history.

(56) References Cited

U.S. PATENT DOCUMENTS

| | | | | |
|---|---|---|---|---|
| 7,936,999 | B1 * | 5/2011 | Hawryluck | H04L 7/0075 398/208 |
| 8,306,431 | B2 * | 11/2012 | Takahara | H04B 10/532 398/205 |
| 10,033,468 | B2 * | 7/2018 | Suzuki | H04B 10/612 |
| 10,205,534 | B2 * | 2/2019 | Mehrvar | H04B 10/25 |

(Continued)

FOREIGN PATENT DOCUMENTS

| | | |
|---|---|---|
| JP | 2013046162 A | 3/2013 |
| KR | 10-0994981 B1 | 11/2010 |

(Continued)

*Primary Examiner* — Hanh Phan
(74) *Attorney, Agent, or Firm* — Rabin & Berdo, P.C.

(57) ABSTRACT

Provided is an operation method of a coherent optical reception system. The operation method includes the following configurations. A coherent optical receiver configured to receive light from at least two light sources; a local oscillator (LO) configured to transmit first LO light to the coherent optical receiver, and a polarization controller configured to transmit a signal for polarization control to the LO, wherein the polarization controller is configured to transmit a first control signal to the LO on the basis of a first reception signal, and the LO is configured to transmit second LO light to the coherent optical receiver on the basis of the first control signal.

9 Claims, 7 Drawing Sheets

(56) References Cited

U.S. PATENT DOCUMENTS

| | | | |
|---|---|---|---|
| 2010/0329697 | A1 | 12/2010 | Koizumi et al. |
| 2011/0008059 | A1 | 1/2011 | Chang et al. |
| 2012/0189078 | A1 | 7/2012 | Eom et al. |
| 2013/0156424 | A1 | 6/2013 | Youn et al. |
| 2014/0029959 | A1 | 1/2014 | Koizumi et al. |
| 2014/0294333 | A1 | 10/2014 | Chang et al. |
| 2018/0292605 | A1 | 10/2018 | An |

FOREIGN PATENT DOCUMENTS

| | | | |
|---|---|---|---|
| KR | 1020100138772 | A | 12/2010 |
| KR | 10-2011-0005575 | A | 1/2011 |
| KR | 10-2013-0068156 | A | 6/2013 |
| KR | 10-2014-0117988 | A | 10/2014 |

* cited by examiner

APPARATUS AND METHOD FOR POLARIZATION CONTROL IN COHERENT OPTICAL RECEPTION SYSTEM

CROSS REFERENCE TO RELATED APPLICATION

The present application claims priority to Korean Patent Application No. 10-2023-0026616, filed 28 Feb. 2023, the entire contents of which is incorporated herein for all purposes by this reference.

BACKGROUND OF THE INVENTION

Field of the Invention

The present disclosure relates to a technology related to a coherent optical reception system. More particularly, the present disclosure relates to a coherent optical reception system to which a local oscillator capable of polarization control is applied.

Description of the Related Art

Recently, as a transmission rate required for optical communication system has increased significantly, a coherent optical transmission method, which enables high-speed transmission due to high frequency efficiency and long-distance transmission due to good reception sensitivity, is attracting attention. In the coherent optical transmission method, signals are transmitted by modulating the intensity and phase of constant-wave (CW) light, which functions as a carrier. In order to detect the of the modulated intensity and phase of the signal light, the signal light and local oscillator (LO) light are simultaneously received to cause optical beating and the beating components are received.

In order to induce optical beating, polarized light rays of two light rays for beating need to match. However, signal light rotates randomly during optical transmission. To this end, the coherent optical reception system uses polarization beam splitters (PBSs) to independently receive vertically polarized light and horizontally polarized light, and restores rotated polarized light by using a multi-input multi-output (MIMO) algorithm in a signal processing process.

However, due to the polarization dependent loss (PDL) of the optical transmission/optical reception system or the performance difference between the devices of the two polarization paths, there may be a difference between the signal qualities of the two polarization paths. Therefore, there is a need to compensate for this and improve received signal quality.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a technology for monitoring received signal intensity or quality, and controlling polarized light of LO light to maximize signal quality.

According to an embodiment of the present disclosure, there is provided a coherent optical reception system including: a coherent optical receiver configured to receive light from at least two light sources; a local oscillator (LO) configured to transmit first LO light to the coherent optical receiver; and a polarization controller configured to transmit a signal for polarization control to the LO, wherein the polarization controller is configured to transmit a first control signal to the LO on the basis of a first reception signal, and the LO is configured to transmit second LO light to the coherent optical receiver on the basis of the first control signal.

In addition, the polarization controller may be configured to receive the first reception signal from a signal processor, the signal processor being configured to receive a signal corresponding to the first LO light from the coherent optical receiver and process the signal into a digital signal, and identify intensity or quality or both of the first reception signal, and generate the first control signal to maximize the intensity or the quality or both of the first reception signal.

In addition, the polarization controller may be configured to receive a second reception signal from the signal processor, the signal processor being configured to receive a signal corresponding to the second LO light from the coherent optical receiver and process the signal into a digital signal, and identify intensity or quality or both of the second reception signal, and generate a second control signal such that third LO light is changed in the same direction as the second LO light when the intensity or the quality or both of the second reception signal is greater than the intensity or the quality or both of the first reception signal.

In addition, the LO may include an optical attenuator or an interferometer configured to attenuate a control voltage on the basis of the control signal received from the polarization controller, and may be configured to transmit the second LO light on the basis of the control voltage attenuated by the optical attenuator or the interferometer.

In addition, the first control signal may be a signal for controlling signal quality corresponding to vertically polarized light or horizontally polarized light or both of the second LO light.

In addition, the first control signal may be a signal for controlling light intensity corresponding to vertically polarized light or horizontally polarized light or both of the second LO light.

According to an embodiment of the present disclosure, there is provided an operation method of a local oscillator (LO) in a coherent optical reception system, the operation method including: transmitting first local oscillator (LO) light to a coherent optical receiver; receiving a first control signal for polarization control from a polarization controller, the first control signal being generated on the basis of a first reception signal corresponding to the first LO light; and transmitting second LO light on the basis of the first control signal to the coherent optical receiver.

In addition, the first control signal may be generated by the polarization controller to maximize intensity or quality or both of the first reception signal.

In addition, the operation method may further include: attenuating a control voltage on the basis of the control signal received from the polarization controller, and transmitting the second LO light on the basis of the attenuated control voltage.

In addition, the first control signal may be a signal for controlling signal quality corresponding to vertically polarized light or horizontally polarized light or both of the second LO light.

In addition, the first control signal may be a signal for controlling light intensity corresponding to vertically polarized light or horizontally polarized light or both of the second LO light.

According to an embodiment of the present disclosure, there is provided an apparatus for a local oscillator (LO) in a coherent optical reception system, the apparatus including: a transceiver; and at least one controller operably connected to the transceiver, wherein the at least one controller is configured to transmit first local oscillator (LO) light to a coherent optical receiver, receive a first control signal for polarization control from a polarization controller, the first control signal being generated on the basis of a first reception signal corresponding to the first LO light, and transmit second LO light on the basis of the first control signal to the coherent optical receiver.

In addition, the first control signal may be generated by the polarization controller to maximize intensity or quality or both of the first reception signal.

In addition, the at least one controller may be configured to attenuate a control voltage on the basis of the control signal received from the polarization controller, and transmit the second LO light on the basis of the attenuated control voltage.

In addition, the first control signal may be a signal for controlling signal quality corresponding to vertically polarized light or horizontally polarized light or both of the second LO light.

In addition, the first control signal may be a signal for controlling light intensity corresponding to vertically polarized light or horizontally polarized light or both of the second LO light.

The present disclosure can provide a technology for monitoring received signal intensity or quality, and controlling polarized light of LO light to maximize signal quality.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
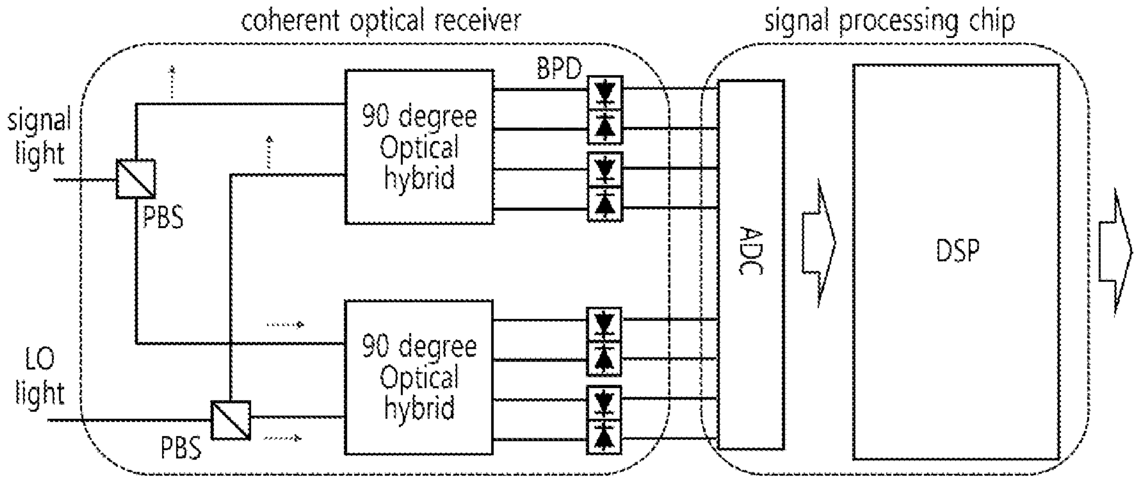
FIG. 1 illustrates a coherent optical reception system according to an embodiment of the present disclosure.

The phrases "some embodiments" or "an embodiment" appearing in various places in this specification do not necessarily all refer to the same embodiment.

Some embodiments of the present disclosure may be represented by functional block configurations and various processing steps. Some or all of these functional blocks may be realized by various numbers of hardware and/or software configurations that perform particular functions. For example, the functional blocks of the present disclosure may be realized by one or more microprocessors or by circuit configurations for a particular function. In addition, for example, the functional blocks of the present disclosure may be realized in various programming or scripting languages. The functional blocks may be realized by algorithm executed by one or more processors. In addition, the present disclosure may employ conventional techniques for electronic environment setting, signal processing, and/or data processing. Terms such as "mechanism", "element", "means", and "configuration" may be used widely and are not limited as mechanical and physical configurations.

In addition, connection line or connection members between elements shown in the drawings merely exemplify functional connections and/or physical or circuit connections. In an actual device, connections between elements may be represented by various functional connections, physical connections, or circuit connections that are replaceable or added.

FIG. 1 illustrates a coherent optical reception system according to an embodiment of the present disclosure.

Referring to FIG. 1, the coherent optical reception system includes a coherent optical receiver (hereinafter, referred to as an "optical receiver") and a signal processing chip.

The optical receiver may simultaneously receive signal light and local oscillator (LO) light to perform optical beating, and may receive beating components according to optical beating.

Optical beating is an optical phenomenon that occurs when two coherent light waves with slightly different frequencies interfere with each other. The interference produces periodic changes in the intensity of light called "beating". The frequency of optical beating is equal to the frequency difference between the two light waves, and the period of the beating is inversely proportional to the frequency difference. Optical beating may be used in a variety of application fields including optical heterodyne detection, laser frequency stabilization, and optical frequency metrology.

In order to induce optical beating, the polarized light rays of two light rays for beating need to match. However, signal light rotates randomly during optical transmission. To this end, the coherent optical reception system uses polarization beam splitters (PBSs) to independently receive vertically polarized light and horizontally polarized light, and restores rotated polarized light by using a multi-input multi-output (MIMO) algorithm in a signal processing process.

The signal light transmitted over a transmission network is split by the PBS into horizontally polarized light and vertically polarized light. The local oscillator (LO) light is also split by the PBS into horizontally polarized light and vertically polarized light. In the case of the signal light, polarized light rotates randomly through optical transmission. Since the polarization state of the signal light is unknown, the polarized light of the LO light is set such that the horizontally polarized light and the vertical component after passing through the PBS have the same intensity (that is, a 45 degree angle). The beating components of the input signal light and LO light are detected through optical hybrids and BPDs. (The operations of the optical hybrids and the BPDs are outside the scope of interest of the present disclosure and are not described in detail) The intensity/phase component of the detected signal light passes through an ADC and is converted into a digital signal, and the original signal is restored through signal processing by a DSP.

Figure 2:
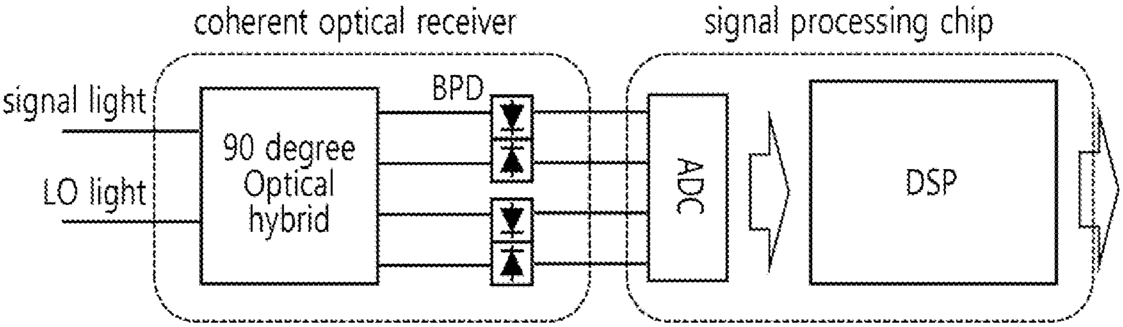
FIG. 2 illustrates an example of a coherent optical reception system operating in a single polarization form according to an embodiment of the present disclosure.

FIG. 2 illustrates an example of a coherent optical reception system operating in a single polarization form according to an embodiment of the present disclosure.

When a single polarization form is applied to a coherent optical reception system, coherent optical transmission may be performed over long distances, medium distances, or short distances. However, it may be difficult for the coherent optical reception system to which the single polarization form is applied to independently receive two polarized light rays using a PBS. A device for matching polarized light rays of signal light and LO light or a separate device for receiving regardless of the polarization of signal light is required, and will be described later with reference to FIG. 6.

Figure 3:
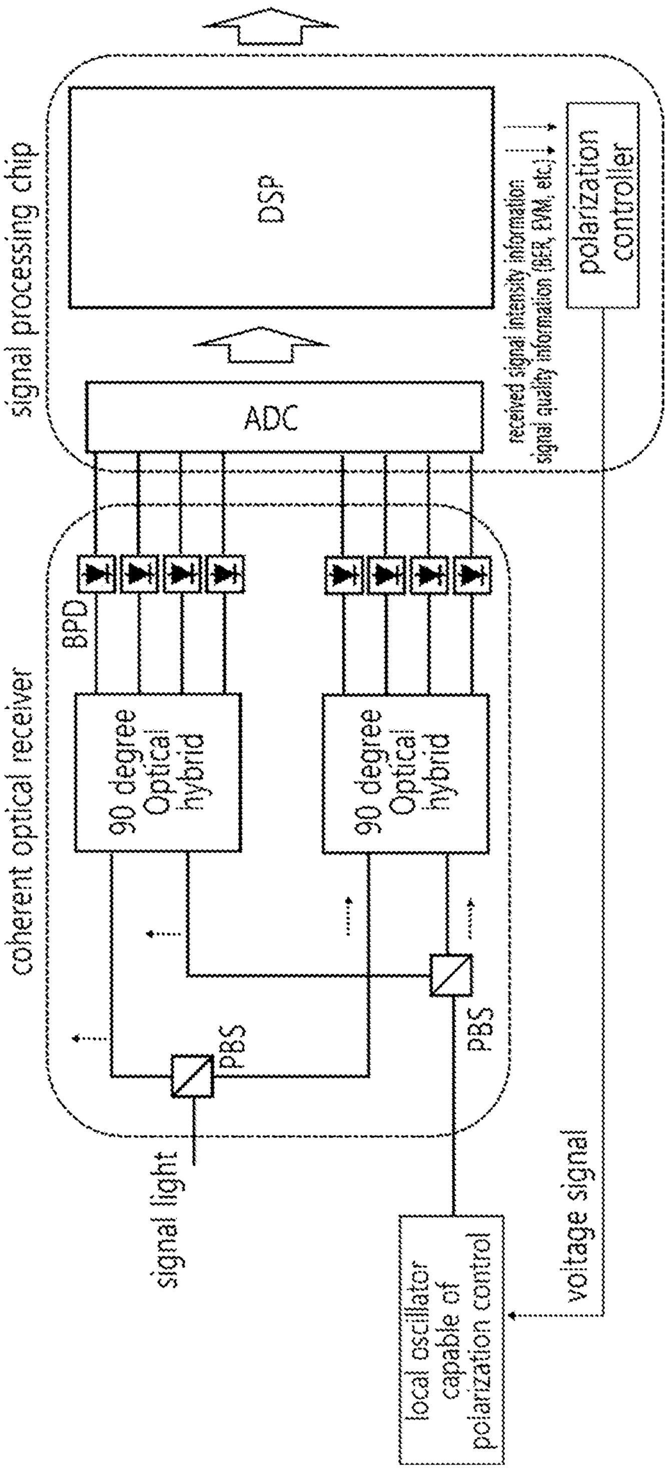
FIG. 3 illustrates a coherent orphan reception system according to an embodiment of the present disclosure.

FIG. 3 illustrates a coherent orphan reception system according to an embodiment of the present disclosure.

Compared to the coherent optical reception system shown in FIG. 1, the coherent optical reception system shown in FIG. 3 further includes a polarization controller, and a local oscillator (hereinafter, referred to as a "local oscillator") capable of polarization control.

Specifically, the polarization controller receives received signal intensity information or signal quality information from a DSP and generates a control signal to maximize intensity or quality. In addition, the polarization controller may transmit the generated control signal to the local oscillator.

The local oscillator may receive the control signal from the polarization controller, and may output polarized light controlled on the basis of the control signal.

In the case of the coherent optical reception system, the polarization state of the signal light is unknown, so the polarized light of the LO light is set such that the horizontally polarized light and the vertical component after passing through the PBS have the same intensity (that is, a 45 degree angle).

However, due to the polarization dependent loss (PDL) of the optical transmission/optical reception system or the performance difference between the devices of the two polarization paths, there may be a difference between the signal qualities of the two polarization paths. In general, the overall performance of the system is best when the signal qualities of the two polarization paths are the same. Therefore, the overall performance of the system may be improved by equalizing the signal qualities of the two polarized light rays.

To this end, the polarized light of the LO light may be adjusted. For example, when the signal quality of the horizontal polarization path is lower than the signal quality of the vertical polarization path, the polarized light of the LO light is adjusted to be slightly more horizontal so that the intensity of the LO light of the horizontally polarized light after passing through the PBS is greater than the intensity of the LO light of the vertically polarized light. The greater the intensity of the LO light input to the receiver, the better the signal quality. This method may be used to equalize the signal qualities of the two polarization paths.

Figure 4:
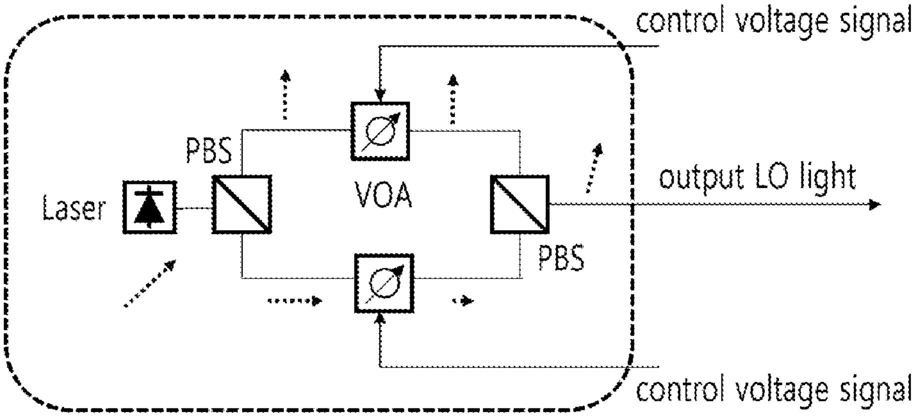
FIG. 4 illustrates a configuration diagram of a local oscillator of a coherent optical reception system according to an embodiment of the present disclosure.

FIG. 4 illustrates a configuration diagram of a local oscillator of a coherent optical reception system according to an embodiment of the present disclosure.

The local oscillator may include a laser, polarization beam splitters (PBSs), and attenuators.

The laser may be a source of optical signals used in the local oscillator. The laser produces coherent light with a narrow linewidth in a particular wavelength used as a reference frequency in an RF system.

The PBSs may perform a function of splitting a laser signal into two separate beams with orthogonal polarized light rays. The two beams resulting from splitting go to different parts of the RF system and may provide a reference frequency for each channel.

The attenuators may be used to adjust the amplitude of an optical signal. For example, the attenuators may be variable optical attenuators (VOAs). The VOAs may control an optical output with a precise power level. In addition, the VOAs may dynamically adjust a power level to optimize the performance of the RF system or compensate for environmental changes.

Each of the elements may be related to the overall performance of the local oscillator and the RF system. That is, the laser provides a stable and accurate reference frequency, the PBSs split a signal for use on different channels, and the VOAs control an optical output for optimal performance.

The local oscillator capable of polarization control according to an embodiment of the present disclosure may receive a control signal from the polarization controller, and may control the intensity or quality of the LO light on the basis of the control signal through the variable optical attenuator.

Herein, an operation algorithm of the polarization controller may be realized, for example, in such a manner that the voltage of the control signal is slightly changed and then when the signal quality increases, changes continue in the same direction, or when the signal quality decreases, changes take place in another direction.

Figure 5:
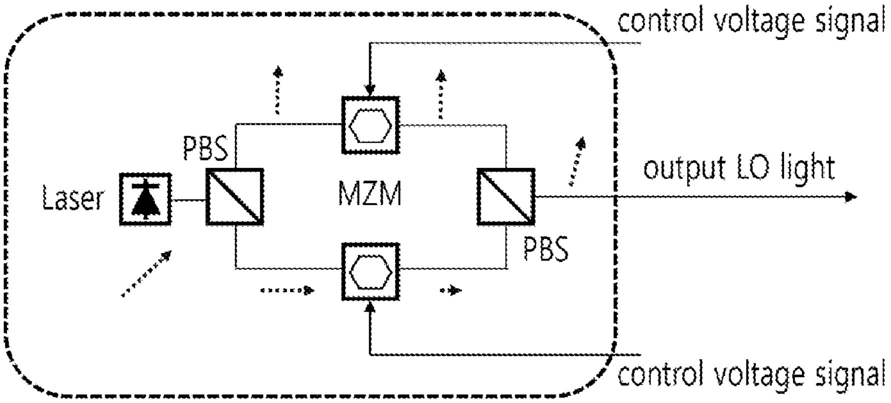
FIG. 5 illustrates another configuration diagram of a local oscillator of a coherent optical reception system according to an embodiment of the present disclosure.

FIG. 5 illustrates another configuration diagram of a local oscillator of a coherent optical reception system according to an embodiment of the present disclosure.

Referring to FIG. 5, the local oscillator capable of polarization control replace the attenuators shown in FIG. 4 with interferometers. The interferometers may be, for example, Mach-Zehnder interferometers (MZMs).

Similarly to the VOAs, the MZMs have attenuation values different according to voltage signals, so the local oscillator shown in FIG. 5 may perform polarization control in the same manner as the local oscillator shown in FIG. 4 does.

Figure 6:
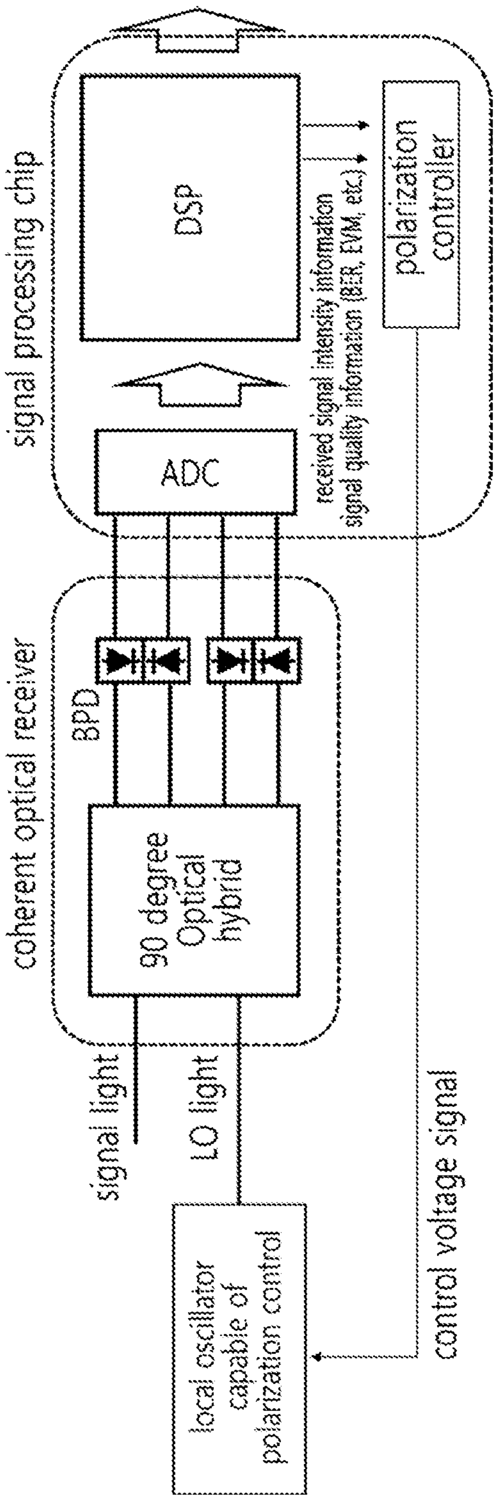
FIG. 6 illustrates a single polarization form of a coherent optical reception system according to an embodiment of the present disclosure.

FIG. 6 illustrates a single polarization form of a coherent optical reception system according to an embodiment of the present disclosure.

In the case of the coherent optical reception system to which a single polarization form is applied, when polarized light rays of signal light and LO light match, optical beating occurs and beating signals are detected. Therefore, it is necessary to rotate the polarized light of the LO light according to the polarization state of the signal light.

Accordingly, the more accurately the polarized light rays of the signal light and the LO light match, the greater the size of the BPD output signal. By using this, the polarization controller may control the local oscillator capable of polarization control so as to maximize the size of the received signal.

That is, the coherent optical reception system may be realized in a single polarization form by using the local oscillator and the polarization controller of the coherent optical reception system according to an embodiment of the present disclosure.

Figure 7:
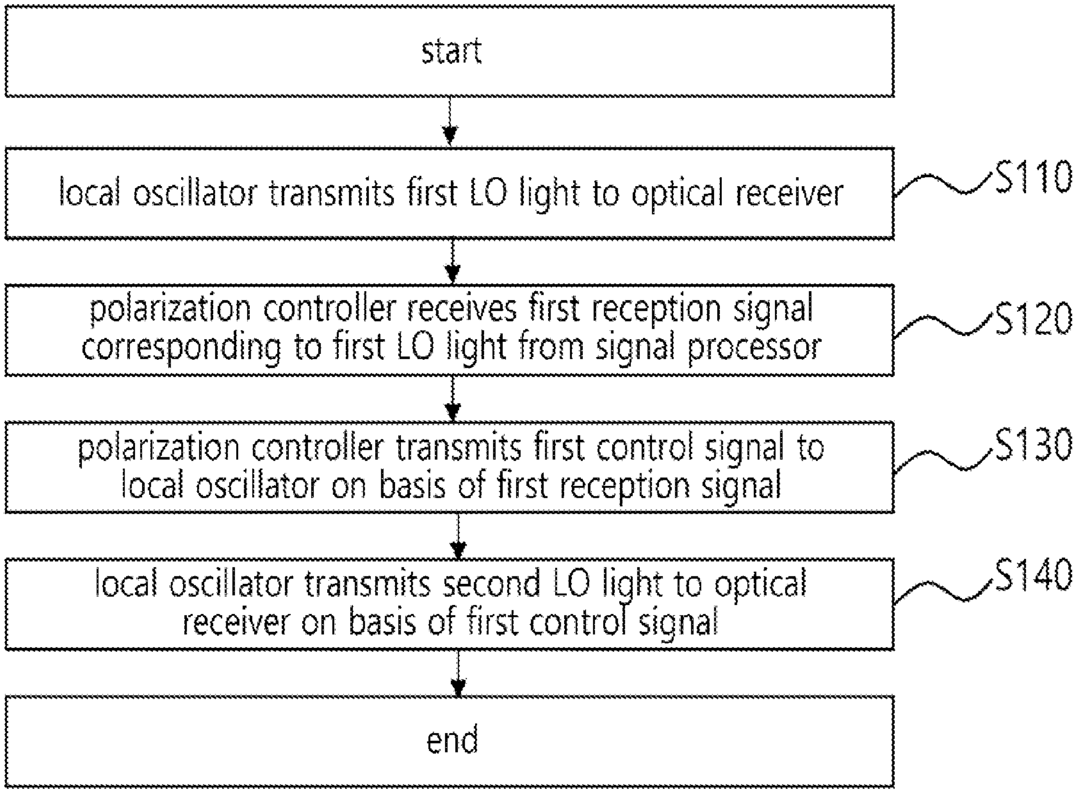
FIG. 7 illustrates a flowchart of the operation of a coherent optical reception system according to an embodiment of the present disclosure.

FIG. 7 illustrates a flowchart of the operation of a coherent optical reception system according to an embodiment of the present disclosure.

Referring to FIG. 7, the coherent optical reception system includes a local oscillator, a polarization controller, an optical receiver, and a signal processing chip (hereinafter, referred to as a "signal processor").

In step S110, the local oscillator transmits first LO light to the optical receiver.

Herein, the first LO light may be understood to include LO light that is not generated on the basis of a control signal obtained from the polarization controller. The optical receiver may receive the first LO light and signal light simultaneously. Herein, the signal light may mean the light obtained by modulating the intensity or phase or both of CW light.

In step S120, the polarization controller receives a first reception signal corresponding to the first LO light from the signal processor.

The signal processor may receive a signal corresponding to the first LO light or second LO light from the coherent optical receiver and may process the signal to a digital signal. Herein, the processed digital signal may be referred to as a first reception signal or a second reception signal.

In step S130, the polarization controller may transmit a first control signal to the local oscillator on the basis of the first reception signal.

The polarization controller may identify the intensity or quality or both of the first reception signal, and may generate the first control signal to maximize the intensity or quality or both of the first reception signal.

In addition, the polarization controller may identify the intensity or quality or both of the second reception signal. When the intensity or quality or both of the second reception signal are greater than the intensity or quality or both of the first reception signal, a second control signal is generated such that third LO light is changed in the same direction as the second LO light.

In step S140, the local oscillator transmits the second LO light to the optical receiver on the basis of the first control signal.

The local oscillator may further include an optical attenuator or an interferometer that attenuates control voltage on the basis of a control signal received from the polarization controller.

In addition, the local oscillator may transmit the second LO light on the basis of the control voltage attenuated by the optical attenuator or the interferometer.

Herein, the first control signal may be a signal for controlling the signal quality corresponding to the vertically polarized light or the horizontally polarized light or both of the second LO light, or may be a signal for controlling the light intensity corresponding to the vertically polarized light or the horizontally polarized light or both of the second LO light.

By applying the present disclosure, polarized light of LO light is controlled to optimize the overall performance of the system, thereby improving signal quality. In addition, this structure can be easily applied to existing systems, as it is applied without changing the configurations of the signal paths of the existing systems.

The embodiments of the present disclosure described above are not realized only through an apparatus and a method, and may be implemented through a program that executes functions corresponding to the configurations of the embodiments of the present disclosure or through a recording medium on which the program is recorded.

Although preferred embodiments of the present disclosure have been described for illustrative purposes, those skilled in the art will appreciate that various modifications, additions and substitutions are possible, without departing from the scope and spirit of the disclosure as disclosed in the accompanying claims.

Specific embodiments for implementing the present disclosure have been described. The present disclosure may include the above-described embodiments as well as embodiments simply changed in design or easily changed. In addition, the present disclosure may also include techniques easily modified using the embodiments and implemented. Therefore, the scope of the present disclosure should not be defined as being limited to the embodiments, but should be defined by the appended claims and equivalents thereof.

What is claimed is:

1. A coherent optical reception system, comprising:

a coherent optical receiver configured to receive light from at least two light sources;

a local oscillator (LO) configured to transmit first LO light to the coherent optical receiver; and a polarization controller configured to transmit a signal for polarization control to the LO, wherein the polarization controller is configured to:

receive a first reception signal from a signal processor, the signal processor being configured to receive a signal corresponding to the first LO light from the coherent optical receiver and process the signal into a digital signal, identify an intensity or a quality or both of the first reception signal, and generate a first control signal based on the first reception signal to maximize the intensity or the quality or both of the first reception signal, and transmit the first control signal to the LO, and the LO is configured to transmit second LO light to the coherent optical receiver based on the first control signal.

2. The coherent optical reception system of claim 1, wherein the polarization controller is configured to receive a second reception signal from the signal processor, the signal processor being configured to receive a signal corresponding to the second LO light from the coherent optical receiver and process the signal into a digital signal, identify intensity or quality or both of the second reception signal, and generate a second control signal such that third LO light is changed in a same direction as the second LO light when the intensity or the quality or both of the second reception signal is greater than the intensity or the quality or both of the first reception signal.

3. The coherent optical reception system of claim 1, wherein the LO comprises an optical attenuator or an interferometer configured to attenuate a control voltage on the basis of the signal for polarization control transmitted by the polarization controller, and the LO is configured to transmit the second LO light on the basis of the control voltage attenuated by the optical attenuator or the interferometer.

4. The coherent optical reception system of claim 1, wherein the first control signal is a signal for controlling signal quality corresponding to vertically polarized light or horizontally polarized light or both of the second LO light.

5. The coherent optical reception system of claim 1, wherein the first control signal is a signal for controlling light intensity corresponding to vertically polarized light or horizontally polarized light or both of the second LO light.

6. An operation method of a local oscillator (LO) in a coherent optical reception system, the operation method comprising:

transmitting first local oscillator (LO) light to a coherent optical receiver;

receiving a first control signal for polarization control from a polarization controller, the first control signal being generated on the basis of a first reception signal corresponding to the first LO light; and transmitting second LO light on the basis of the first control signal to the coherent optical receiver, wherein the polarization controller is configured to:

receive the first reception signal from a signal processor, the signal processor being configured to receive a signal corresponding to the first LO light from the coherent optical receiver and process the signal into a digital signal, identify an intensity or a quality or both of the first reception signal, and generate the first control signal based on the first reception signal to maximize the intensity or the quality or both of the first reception signal, and transmit the first control signal to the LO, and wherein the LO is configured to transmit second LO light to the coherent optical receiver based on the first control signal.

7. The operation method of claim 6, further comprising:

attenuating a control voltage on the basis of the first control signal received from the polarization controller; and transmitting the second LO light on the basis of the attenuated control voltage.

8. The operation method of claim 6, wherein the first control signal is a signal for controlling signal quality corresponding to vertically polarized light or horizontally polarized light or both of the second LO light.

9. The operation method of claim 6, wherein the first control signal is a signal for controlling light intensity corresponding to vertically polarized light or horizontally polarized light or both of the second LO light.

* * * * *